Jan. 26, 1954

R. E. ELLIS ET AL 2,667,023

COTTON HARVESTER

Filed Feb. 10, 1950

Riley E. Ellis
Joseph A. Ashkouti
INVENTORS

BY
Shreve, Crowe & Gordon
Attorneys

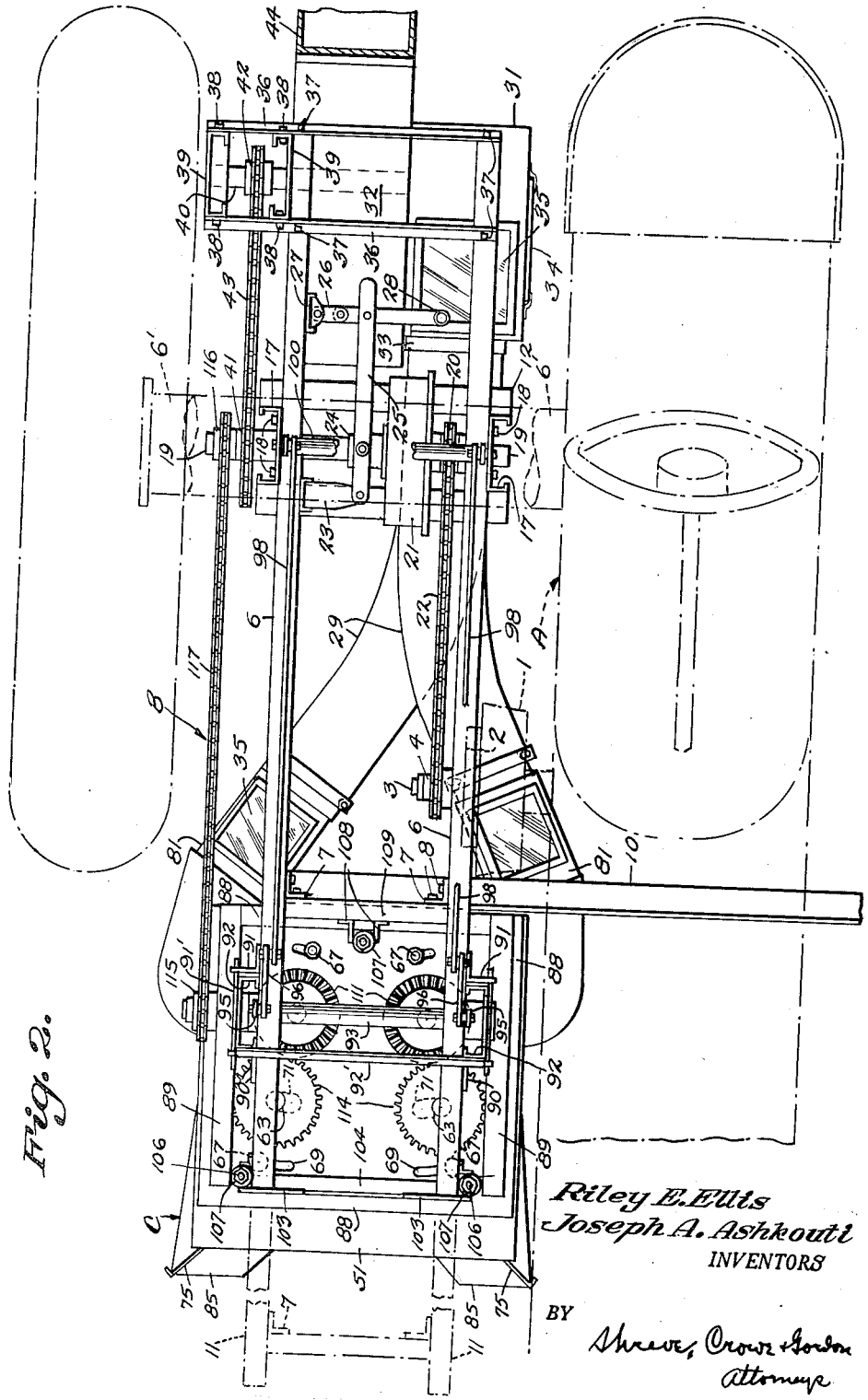

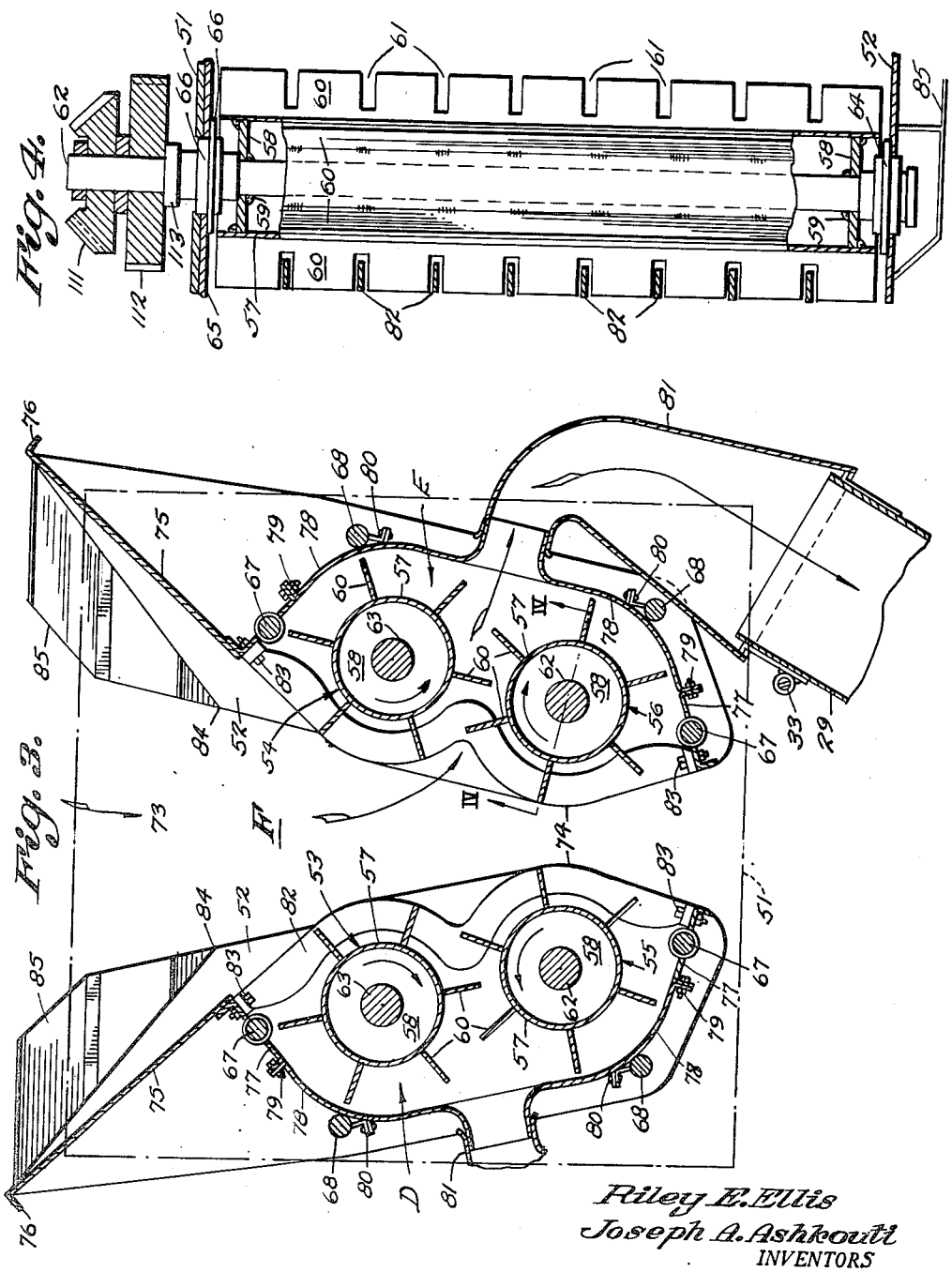

Jan. 26, 1954　　　　R. E. ELLIS ET AL　　　　2,667,023
COTTON HARVESTER
Filed Feb. 10, 1950　　　　　　　　　　　　　　　4 Sheets-Sheet 4
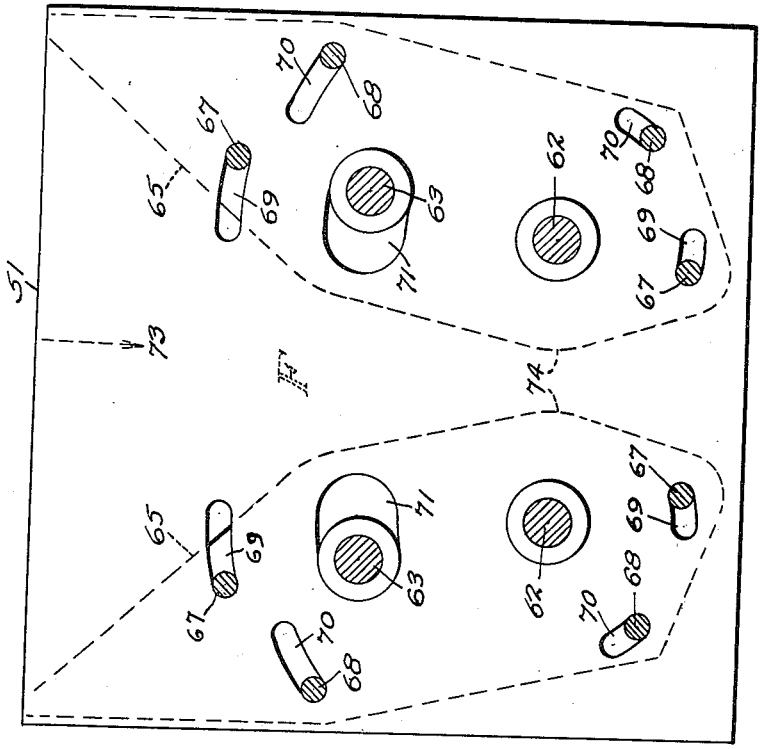
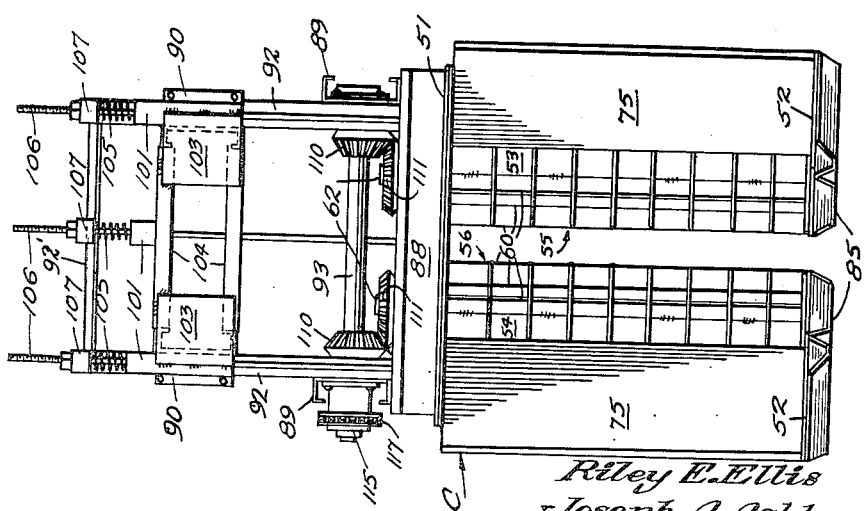
Riley E. Ellis
Joseph A. Ashkouti
INVENTORS
BY
Shreve, Crowe & Gordon
Attorneys Patented Jan. 26, 1954

2,667,023

UNITED STATES PATENT OFFICE 2,667,023

COTTON HARVESTER

Riley E. Ellis, Griffin, and Joseph A. Ashkouti, Atlanta, Ga.

Application February 10, 1950, Serial No. 143,564

6 Claims. (Cl. 56—12)

Generically this invention relates to harvesters, but more particularly to a type of harvester for removing and gathering cotton from the cotton plants.

One of the principal objects of this invention is the provision of automatic mechanism of this type powered by and attached to a motorized vehicle mounted on the side of the vehicle to effect gathering of the cotton from the plants during forward travel of the vehicle.

Another object of this invention is the provision of cotton harvesting mechanism, such mechanism adapted to be detachably mounted on one or both sides of a motorized vehicle, powered by the vehicle, and including a floatingly supported gathering head mechanism for separating the cotton from a row or rows of cotton plants during forward travel of the vehicle without damage or injury to the cotton.

Another important object of this invention is the provision of a cotton harvesting unit, adapted to be removably attached to one or both sides of a motorized vehicle and of a length not greater than the length of the vehicle, and including a floating head automatically adjustable with respect to said unit, said head adapted to receive the plants of a row and effect separation of the cotton from the plants during the forward travel of the head.

A further important object of this invention is the provision of a cotton harvester unit including a head adapted to be removably mounted on the side of a motor vehicle, said head including a unit pair of air induction cotton-gathering elements adapted to engage opposite sides of cotton plants for effecting separation of the cotton therefrom during forward travel of the head with respect to said plants, certain elements of each pair being adjustable with respect to each other.

Another important object of this invention is the provision of a seed-cotton harvesting mechanism adapted to be removably attached to one or both sides of a motorized vehicle, said mechanism including a floating head, said head including opposed cylinder units, the respective coacting cylinders of each unit having radially extending blades of a length coincident with that of the cylinder adapted to effect separation of the cotton from the bolls of cotton plants, and at the same time producing induced air draft for directing the cotton between and from the cylinders on opposite sides of the plants during their passage through said head, without affecting the cotton or crushing the seeds.

Another important object of this invention is the provision of a cotton harvester unit including a vertically adjustable head, said unit being powered by and removably attached to the side of a standard tractor-like motor vehicle with the head positioned rearwardly of the front wheels, not interfering with the clear vision of the operator, said head including a unit pair of air induction cotton-gathering elements adapted to engage opposite sides of a row of cotton plants for effecting separation of the cotton from the bolls of the plants and directing it between the elements of each unit, guard means preventing entry of the plant stalks and limbs from passing with the cotton between the elements, a plant guide shield adjacent each element unit providing a plant-receiving throat, said guide shields and element units being adjustable to widen and narrow said throat.

A still further important object of this invention is the provision of a seed cotton harvesting mechanism including a gathering head structure comprising opposed rotor cylinder units, the respective oppositely rotating coacting cylinders of each unit having radially extending vanes of a length coincident with that of the cylinder adapted to effect separation of the cotton from the bolls of cotton plants without injury to the cotton or seeds, the construction and arrangement of the cylinders and vanes and their operation being such as to effect strong induced air draft for assisting in the separation of the cotton from the bolls and directing its free passage between and from the cylinders on opposite sides of the plants without gripping action contact of the cotton by the vanes of said coacting cylinders, which would affect its fluffiness and cause damage thereto by crushing of the seeds.

A still further important object of this invention is the provision of a cotton harvester unit including a floating and vertically adjustable head and an air induction pneumatic cotton delivery means in communication with said head, said entire unit being removably attached to the side of a motor vehicle, said head including a unit pair of air induction cotton-gathering elements, each pair adapted to engage opposite sides of cotton plants for effecting separation of the cotton therefrom during the forward travel of the head with respect to said plants, the cotton passing in opposite directions from the plants between the coacting elements of each unit, said pneumatic delivery means cooperating with said air induction elements in the separation of the cotton from the bolls of said plants and delivering it to a cotton-receiving receptacle, certain elements of each of said pairs being adjustable with respect to each other.

Still another important object of this invention is the provision of a cotton harvester mechanism including a head, said mechanism being removably attached at the side of a standard tractor or the like, said head including opposite pairs of coacting cylinders, the cylinders of each pair rotating in opposite directions, each cylinder having equi-spaced integral radially extending vanes coextensive with the length of the cylinders constituting air induction means, the vanes of the coacting cylinders being so arranged with respect to each other and so engageable with the cotton plants that the cotton will be separated from the bolls and passed between the coacting cylinders in a manner such that its fluffiness will be maintained and no damage to the cotton by crushing of the seeds effected, means for pneumatically delivering the cotton from the head to a cotton-receiving means, and means for effecting vertical adjustment of the head with respect to said mechanism.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 2 is an enlarged plan view of the invention and the tractor in dot and dash lines.

Fig. 3 is an enlarged sectional view taken on the line 3—3 of Fig. 1 looking in the direction of the arrows.

Fig. 4 is a side elevational view of one of the coacting cylinders partly in section, and with parts broken away.

Fig. 5 is an enlarged front elevational view of the invention detached from a vehicle.

Fig. 6 is an enlarged plan view of the top head plate with top connections removed and showing the underlying plates in dot and dash lines.

Figure 1:
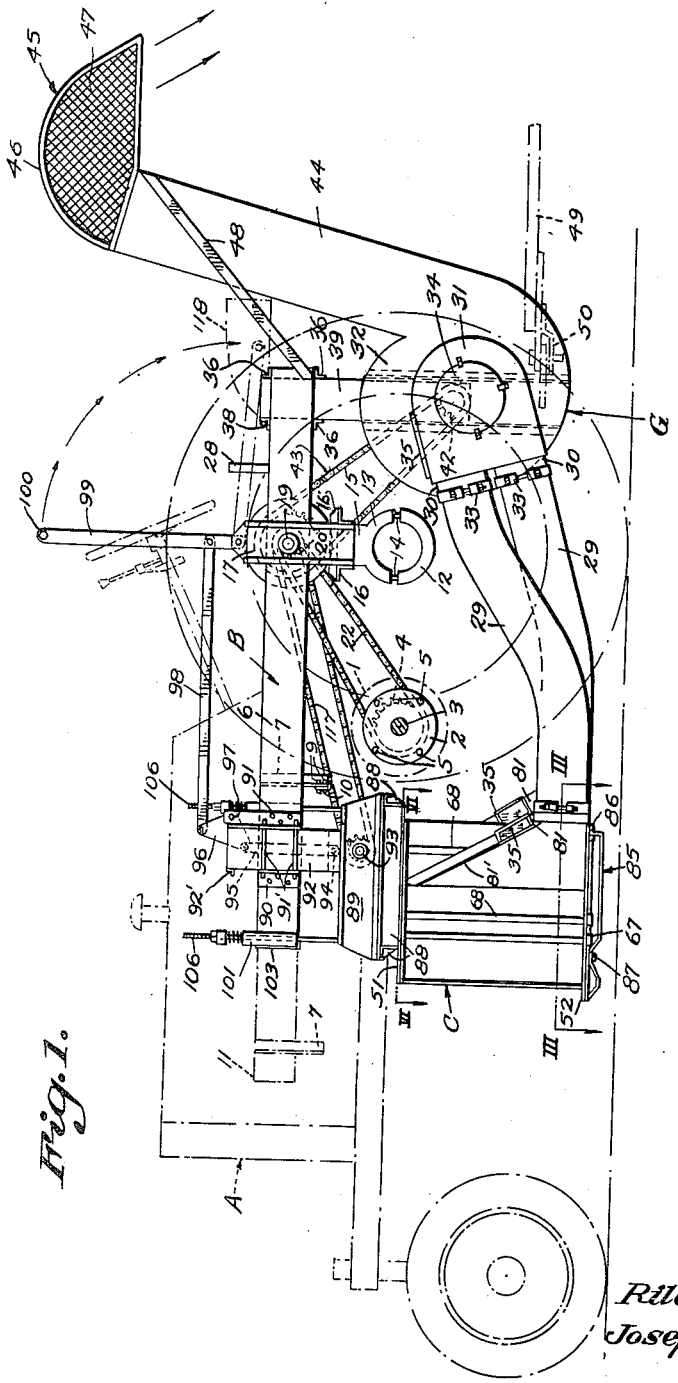
Fig. 1 is a side elevational view of the cotton harvester device attached to a tractor.

Briefly the cotton picking or harvesting machines with which we are familiar have proven deficient in many respects such as having picking fingers for pulling the cotton from the bolls which have proven unsatisfactory in many respects, such as leaving an appreciable quantity unpicked, clogging of the picking elements and embodying large and expensive structures, other types employing rotatable coacting elements for effecting removal of the cotton from the plants and having means for gripping the cotton in course of the removal operation, causing crushing of the seeds and damage to the cotton, and it was to overcome these and other disadvantages that we provided our compact harvester unit attachable to one or both sides of a standard tractor or like motorized vehicle for harvesting one or more rows of cotton plants, easily mountable and demountable in a few minutes with respect to a standard tractor, so that the tractor is available for normal usage. In view of the compactness of the device the head is necessarily positioned rearwardly of the front wheels so that the manner of reception of the plants is viewable by the operator, the head being floatingly supported on the frame and manually adjustable with respect thereto in accordance with the heighth of the plants and road travel, certain of the cylinders and plant shield elements being relatively adjustable with respect to each other, the plant-engaging cylinder elements being adapted to effect separation of the cotton from the plants, providing air induction directing the cotton through the respective units without crushing of the seeds or damage to the cotton, said device embodying a cooperative air induction system for delivering the cotton from the device.

In the illustrated embodiment characterizing this invention there is shown a tractor or like motorized vehicle of conventional construction A, a seed cotton harvester unit B including a cotton-gathering head assembly C. The tractor is equipped with the usual drive or power take-off pulley 1, and a face plate 2 with a stub shaft 3 on which is mounted and splined or otherwise suitably secured drive sprocket 4 secured to pulley 1 by bolts 5 or other suitable fastening means.

The cotton harvester unit B comprises the spaced longitudinally extending main frame members 6 to which are secured the vertical angle iron supports 7 secured to said frame by bolts 8 or in any suitable manner, the lower ends of which are connected by bolts 9 to the frame supporting bar 10, suitably carried by and secured to said tractor A. Where a tractor has no supporting arm 10 at the position shown, channel bars 11 may be bolted to or made extensions of frame members 6 and the vertical supports 7 may be located to tie into the tractor in whatever vertical plane the tractor supporting bar 10 may be located as will be well understood.

In order to support the rear portion of the main frame members 6 from rear axle 6' a rear axle housing member 12 provides a rear support for the longitudinal frames 6 and is attached to said axle 6' by a pair of collar clamps 13 secured to the housing by bolt members 14, said member 13 being formed with upwardly projecting extensions 15, the respective portions being connected on opposite sides by angle members 16 secured to extensions 15 and the lower ends of the vertical channel members 17 by bolts 18 adapted to support frame members 6 to which members 17 are bolted or otherwise suitably secured. A strengthening member 16' is mounted on and bolted or otherwise attached to angle members 16.

Mounted in frame members 6 and vertical members 17 and journaled in suitable bearings is the main drive shaft 19, and sprocket 20 is attached to clutch 21 and is adapted to rotate freely on the main drive shaft 19 when the clutch is disengaged (Fig. 2), said sprocket and drive shaft being driven from sprocket 4 of power take-off pulley 1 by chain 22, the clutch being of standard construction. Bolted or otherwise secured to frame members 6 is a horizontal bracket 23 and pivotally connected to said bracket and the clutch member 24 is arm 25 for operating clutch 21 by means of toggle-link 26 connected to bracket 27 suitably mounted on frame members 6, and to operating handle 28 having pivotal connection to arm 25 for effecting operation of said clutch by toggle linkage 26 and 28 to control the operation of head C by the operator.

Leading off from head unit or assembly C is a pair of pneumatic conveying tubes 29 which are connected to the flange projections 30 of the cotton header 31 connected to and communicating with the fan blower casing 32. The tubes 29 are connected to the flange 30 by clamps 33, and the header 31 is provided with an opening giving access thereto and closed by a removable cover plate 34, said header also being provided with a transparent inspection window 35.

Mounted on the rear ends of frame members 6 and extending beyond one of said members are a pair of spaced angle bars 36 secured to members 6 by bolts 37, and mounted between the free ends of bar 36 and secured thereto by bolts 38 is a vertical U-shaped-like flat angle member 39 and similarly mounted adjacent the edge of frame members 6 is a similar member 39 secured to bars 36 by bolts 38. These bars 39 extend in parallelism downward to the bottom of casing 32 to one of which said casing is suitably secured; said members are also connected by and secured to another pair of similar angle bars 36 by bolts 38 at the undersurface of members 6, Fig. 1, which rigidly brace said members, and journaled in suitable bearings mounted in members 39 is a fan drive shaft 40 mounted in casing 32. Mounted on main drive shaft 19 is a sprocket 41 and mounted on fan shaft 40 is a sprocket 42 driven by chain 43 from sprocket 41.

Extending upwardly from casing 32 is a pipe 44 on the top of which is suitably mounted a cap member 45 having a solid arcuate outwardly extending top 46, the sides of said cap being closed by a wire mesh screen 47. The upper end of the pipe 44 is secured to the end of frame members 6 by brace bars 48. The fan blower (not shown) contained in casing 32, as above described, is driven by main drive shaft 19 and is adapted to develop an induced draft to pneumatically convey seed-cotton from the collector head C through tubes 29 into casing 32 and then by pressure through pipe 44 to cap member 45, said member 45 being designed to decrease the velocity of the cotton and to deflect it by means of the formation of top 46, the screen structure 47 assisting in the pressure reduction, so that the cotton will be directed into a trailer-cart or the like having a tongue 49 connected to the usual tractor-hitch device 50 as will be well understood (said cart or wagon not shown). It might be well to point out at this time that the broad, flat, U-shaped-like frame members 6 and 39 are of light weight as well as of strong tensile strength and readily demountable with respect to each other or as a unit from the tractor as will be hereinafter more fully pointed out.

From the drawings it will be apparent that the clear vision of the operator is unobstructed by the harvester unit B, and while only one unit B for a single row of cotton plants is illustrated, a similar unit is adapted to be mounted on the other side of the motorized vehicle and owing to the compactness and substantial light weight of the unit, with slight modification, an additional unit may be mounted on each side of the first mentioned unit B. The head assembly C will now be described.

*Head assembly*

Mounted on the forward ends of the main frame member 6 is cotton harvesting or a cotton-gathering head assembly C which comprises a top plate 51 and bottom plates 52 and mounted between said plates are opposed pairs of coacting cylinder units D and E including the respective forward cylinders 53 and 54 and the respective rear cylinders 55 and 56. All of the cylinders are identical and each comprises a tubular portion 57 provided with spiders or disks 58 spaced inwardly from its ends, mounted on its shaft and spot-welded to the shaft and cylinder as at 59 or in any suitable manner. The tubular portion 57 may be molded or otherwise provided with a series of equi-spaced radially extending vanes 60 of a length corresponding to the length of the tubular portion 57, or said vanes may be detachably secured to the tubular portion 57, if desired. The respective vanes are provided with a series of equi-spaced slots 61 for a purpose directly more fully appearing. The respective rear cylinders 55 and 56 are mounted on shafts 62 and the cylinders 53 and 54 on shafts 63, the respective shafts 62 and 63 being journaled in bearings 64 mounted in their bottom plates 52, the upper ends of said shafts extending through and above the top plate 51.

Overlying each of the respective units D and E and immediately underlying plate 51 is a plate 65, shown in dash lines in Fig. 6, to which the said shafts of said cylinder units are suitably secured by bearings 66 mounted therein, Fig. 4. Connecting the respective bottom plates 52 and top plate 51 are the spacer bolts 67 and similar bolts 68 adapted to lock lower plates 52 and the plates 65 to upper plate 51, said upper plate 51 being formed with slots 69 through which extend said bolts or rods 67 and slots 70 through which extend bolts or rods 68. The said plate 51 is also provided with slots 71 through which extend shafts 63, all of said bolts being secured by nuts 72, the slots permitting, upon loosening said nuts, adjustment of plates 65 with respect to each other, about shafts 62, to narrow or widen the throat 73 with respect to the front cylinders 53 and 54 without varying the width of the cotton plant passage 74, for a purpose directly more fully appearing.

Bolted or otherwise suitably secured to each top plate 65 and its underlying bottom plate 52 is an oppositely flairing guide shield member 75 terminating at its outer end in a right angle flange 76. These shields gather the stray branches of the cotton plants and guide them with their bolls into the head C. In order to provide an exterior casing for the coacting cylinder units D and E extending from the respective top plate 65 to the bottom plates 52 is a sectional casing or wall structure comprising the sections 77 and 78 bolted together as at 79 and secured with respect to top plate 65 and bottom plates 52 by bolts 67 as to sections 77 and bolts 68 connected to sections 78 as at 80, sections 78 having slip connection with the cotton collectors 81 each adapted to engage over the end of a respective pneumatic tube 29 secured by clamp element 33, Figs. 1 and 3, for receiving and delivering the cotton from the coacting cylinders D and E as will be hereinafter more fully explained. Each of the cotton-collecting or receiving members 81 is provided with a transparent inspection window 35 adapted for removal for clean out purpose, if desired.

In order to direct the stalks and branches passing through the machine and to prevent their becoming substantially engaged with the vanes 60 and between the cylinders, a series of guards 82 are designed to follow the arc described by the rotatable vanes 60 and are bolted to the pieces 77 by bolts 83 and are designed to engage in the slots 61 with their smooth exposed edges substantially coincident with the free edges of the vanes, thus permitting the bolls to extend inwardly of the guards so that the cotton is separated therefrom or harvested by the impact of the vanes on the cotton and the air induction produced by the vanes rotating at a predetermined R. P. M., the construction and arrangement of the cylinders and vanes being such that there is no gripping or contact action of the cotton between the vanes of the coacting cylinders whereby free flow of the cotton is effected without damage thereto. With further reference to the wall sections 77 and 78 and bolts 67 and 68, it will be noted that the wall sections and the bolt locations are so symmetrically designed and arranged that they are interchangeable as to right or left hand positions.

The bottom plates 52 extend outwardly shelf-like from the inner end of shield member 75 as at 84 and taper outwardly to points slightly beyond flanges 76. Mounted beneath said plates are the skid plate members 85 bolted to plates 52 as at 86 and 87, said skid plates projecting forwardly beyond plates 52. These skid plates are adapted to present smooth, even surfaces to minimize ground friction and to house the nuts and shaft ends projecting through the bottom plates 52 as will be well understood. Mounted on top plate 51 substantially along its four edges are the four angle iron members 88 bolted or otherwise suitably secured thereto, and mounted on members 88 and suitably bolted thereto are the longitudinally extending angle head members 89. Mounted on each of the frame members 6 are a pair of spaced angle guide members 90 and 91 bolted or otherwise secured to said members, members 91 extending above frame members 6, and slidably mounted between the said guides 90 and 91 are the vertical angle arm members 92. Interconnecting guides 91 are spaced pin guards 91' for the arms 92, the lower ends of which are bolted to members 89, and journaled through members 92 and 89 is cylinder drive shaft 93, the bearings (not shown) for which provide structural joints between said members 89 and 92. Arms 92 are connected at their upper ends by angle bar 92', and pivotally connected to said members 92, as at 94, are the links 95, the upper ends of said links being pivotally connected to bell-cranks 96 pivotally attached to guide members 91, as at 97, and pivotally attached to bell-cranks 96 are the connecting bars 98, the opposite ends of which are connected to the operating arms 99 connected by the handle member 100. Said arms 99 are pivotally anchored to the vertical members 17, and the movement of said handle 100 downwardly from its position shown in Fig. 1 to extreme lowered position effects raising of the head C and locks the head in raised position.

A sleeve 101 is welded or otherwise secured to bracket 102 and the bracket 102 is welded or otherwise secured to each frame member 6 and welded or otherwise secured to a plate 103 suitably secured to cross-bars 104 connecting the ends of the frame members 6. Extending through each of the sleeves and springs 105 seating on said sleeves, are the rods 106 on which are threadedly mounted nuts 107 engageable with said springs. A similar rod 106 has its sleeve 101 welded or otherwise secured to brackets 108 bolted or otherwise secured to cross-bar 109 interconnecting the frame members 6, said rods 106 projecting downwardly within members 89 with their lower ends similarly connected to members 88 whereby said head C is floatingly suspended by said rods 106 on the springs 105, said springs supporting the weight of the head whereby the head is enabled to ride and slide over uneven rows and rocky protuberances on the ground without damage thereto incident to such travel, and at the same time enabling a more efficient cotton-gathering operation.

Mounted on drive shaft 93 adjacent members 92 are the beveled gears 110 adapted to mesh with beveled gears 111 on shaft 62 suitably secured thereon, and underlying beveled gears 111 are the spur gears 112 supported by collars 113 secured to said shaft 62, Fig. 4, said spur gears 112, Fig. 4, meshing with spur gears 114, Fig. 2, mounted on shaft 63 driving cylinders 53 and 54 as will be well understood. Mounted on the end of shaft 93 and projecting beyond member 89 is sprocket 115 adapted to be driven from the sprocket 116 mounted on the end of main drive shaft 19 through chain 117. Said shaft 93, as above stated, drives the coacting cotton-gathering cylinders D and E as heretofore described, the operation of the cotton-gathering cylinders of the head C being controlled by movement of clutch member 21 by handle 28, by the operator from his position in the driver's seat 118 of the tractor A.

With further reference to the arrangement and construction of the head C and its components it will be noted that each of the members 81 extends downwardly and outwardly as at 81' from the upper end of the head or plate 65 to approximately the lower end of window 35 to provide a downwardly and outwardly expanding air and cotton-receiving passage or opening, disposed in a plane perpendicular to a plane passing between the rotors of each pair D and E and which is substantially normal to the plant-receiving passage F, and communicating with the pneumatic tube 29 as will be well understood. It will thus be seen that this construction provides a free and unrestricted air and cotton path from the passage F through the units D and E and to the pneumatic tubes 29.

It is further important to note that the coacting cylinders of each unit D and E are spaced to provide a relatively wide passage therebetween, and the vanes 60 of the respective cylinders are equi-spaced corresponding to the space between the coacting cylinders, and the vanes of each cylinder are staggered or off-set with respect to those of its coacting cylinder so that it is impossible for the cotton to be grippingly caught between the vanes of the coacting cylinders. Therefore, since the cylinders are revolving in opposite directions a free air and cotton path from passageway F to the respective pneumatic tubes 29 is provided so that no damage to the cotton or the seeds can occur.

While the operation of the device would appear to be clear from the above description, it might be well to further state that the respective pairs of rotor cylinders with their associated plant guide shields 75, may be adjusted as a unit with respect to each other to widen or narrow the inlet plant-receiving portion or throat 73 of passage F, without affecting the width of the outlet passage portion at 74, by loosening nuts 72 and then locking said assemblies in adjusted position, in accordance with different sized cotton plants or otherwise, and tightening said nuts.

When the head C is aligned with a cotton row and the clutch is in operating position, the respective cylinder units engage opposite sides of the plant row and the guard members 82 prevent stalks and limbs from becoming caught and carried between the respective coacting cylinders, but the forward movement of the harvesting unit causes the bolls to extend between the guard and the rapid rotation of the vanes effects removal of the cotton from the bolls without damage thereto and the air induction caused by their rapid rotation assists in removing the cotton and impels it along the free path intermediate the coacting cylinders to the outwardly expanding cotton-receiving channels or openings from the head to the pneumatic conveyor mechanism G, the operation of which assists the air induction produced by the cylinders of the pairs D and E, and the cotton is drawn into fan casing 32 and under forced pressure therefrom to pipe 44 from which it is directed by cap member 45 into a suitable receptacle or cotton receiver (not shown) continuously during the forward movement of the harvesting unit. It will thus be apparent that as the plants pass through passage F and through the head, the cotton is removed from the plant bolls by the smooth contacting edges of the vanes 60 and the air induction caused by the rapid rotation thereof and delivered to the receiver by free pneumatic travel without being engaged at any time by gripping or other elements that would cause damage to the cotton or to the seeds, so that the same is delivered to the receiver in its natural fluffy and undamaged state.

It will also be noted that the head C is floatingly suspended from the frame by rods 106 and on springs 105 so as to automatically conform to uneven ground surface formations and also it is manually adjustable by handle 100 to raise the head over rocks or other obstructions and is susceptible of being locked in raised position so that travel from place to place may be readily effected. It will further be apparent that the device B may be mounted on one or both sides of a tractor or the like and readily demounted in a few minutes from its two-point connection so that normal usage of the tractor is not prevented.

It will be apparent that the head C is provided with a solid top 51 and bottom plates 52, defining the plant passageway F, and substantially conforming in configuration to the upper plates 65 between which are rotatably mounted the cylinder units D and E, and which arrangement and construction permits the cotton plants to pass through the head and the cotton-removing operation, and still remain substantially in their original natural condition. This construction therefore tends to prevent the accumulation of trash in the removed cotton.

From the above it will be apparent that we have provided a cotton harvesting mechanism adapted to be carried by a tractor unit or the like, said mechanism including a head yieldably mounted on and manually adjustable with respect to said unit, said head including means for permitting the passage of cotton plants therethrough, said means including a passage through said head, said passage embodying inlet and outlet portions, the inlet portion being variable with respect to the outlet portion, and additional means in connection with the head for removing the cotton from said plants as they pass through said head, said additional means including pairs of cotton-removing cylinders and radially extending air induction vanes arranged and constructed to provide a free air path through each cylinder pair and to protect the cotton and its seed from damage during its passage along said path, a pneumatic air means in communication with said head adapted to deliver the cotton therefrom to a cotton receiver, said harvesting machine being compact, readily mountable and demountable, simple in construction and operation, manufacturable at a reasonable cost, and efficient for the purposes intended.

Although in practice we have found that the form of our invention illustrated in the accompanying drawings and referred to in the above description as the preferred embodiment, is the most efficient and practical; yet realizing that conditions concurrent with the adoption of our invention will necessarily vary, we desire to emphasize that various minor changes in details of construction, proportion and arrangement of parts may be resorted to within the scope of the appended claims without departing from or sacrificing any of the principles of this invention.

Having thus described our invention, what we desire protected by Letters Patent is as set forth in the following claims:

1. A cotton harvester unit, power means in connection with said unit, a head supporting means on said unit, a cotton gathering head yieldably suspended from said supporting means, oppositely arranged pairs of combined rotary impact and air induction devices mounted on said head, said pairs being relatively disposed to define a cotton plant passageway through said head, each pair including vertically disposed cylinders and radial vanes extending from said cylinders and coextensive with their length, the vanes of one of said cylinders of each pair coacting with those of its companion cylinder to provide a circuitous cotton path between said vanes, mechanism for imparting rotary movement to the cylinders, means for effecting power transfer from said power means to said mechanism, and means for delivering the cotton from said head to a receiver.

2. A cotton harvester unit adapted to be removably attached to the side of a tractor or the like, a power means in connection with said unit, an adjustable cotton gathering head structure yieldably suspended from said unit, oppositely arranged pairs of combined impact and air induction devices mounted in said head, said devices being relatively disposed to define a cotton plant passage therebetween, each pair of said devices including vertically disposed cylinders having radial vanes coextensive with their length, the cylinders of each pair adapted to rotate in opposite directions, the vanes of each pair adapted to interactingly extend between and in spaced relation with the vanes of its companion cylinder to provide a circuitous path for the passage of the cotton, mechanism for imparting rotary movement to the cylinders of each pair, means for effecting power transfer from the tractor to said head, means for pivotally mounting the rear cylinder of each pair, means for effecting relative adjustment of the front cylinders of said pairs to vary the area of the forward portion of said plant passage, and pneumatic means for effecting the delivery of the cotton from said head to a receiver.

3. A cotton harvester unit adapted to be attached to a tractor or the like, a power means in connection with said unit, a supporting frame means on said unit, a cotton gathering head floatingly suspended from said frame means, handle means mounted on said unit, rockable means mounted on said unit above said head and having connection with said handle for effecting vertical adjustment of said head, oppositely arranged pairs of combined rotary impact and air induction devices mounted in said head, each pair including vertically disposed cylinders, shafts for said cylinders extending beyond the cylinder ends, radial vanes on said cylinders coextensive with their length, the vanes of a cylinder of each pair interacting with those of its companion cylinder to provide a circuitous cotton path between said vanes, mechanism for imparting rotary movement to the cylinders of each pair, means for effecting power transfer from said power means to said mechanism, top and bottom plates for each pair of cylinders, said cylinder shafts extending through and journaled to said top and bottom plates, a top plate for said head overlying said top plate and through which extend said shafts, said opposed devices adapted to define a plant passage therebetween, means for effecting relative adjustment of the forward cylinders of each pair laterally towards each other to vary the forward area of said plant passage without altering the spacing of the rear cylinder of each pair and pneumatic means for delivering the cotton from said head to a receiver.

4. A cotton harvester unit, a power means in connection with said unit, a head supporting means on said unit, a cotton gathering head floatingly suspended from said supporting means, oppositely arranged pairs of combined rotary impact and air induction devices mounted in said head, said pairs being relatively disposed to define a cotton plant passageway therebetween, each pair including vertically disposed cylinders and radial vanes extending from said cylinders and coextensive with their length, the vanes of one of said cylinders of each pair coacting with those of its companion cylinder to provide a circuitous air and cotton path between said vanes, mechanism for imparting rotary movement to the cylinders of each pair, means for effecting power transfer from said power means to said mechanism, exterior casing means for said devices, means in connection with said casing means forming expanding air and cotton receiving openings extending in a vertical plane passing between the cylinders of each pair and substantially normal to said plant passage, a pneumatic means in communication with said openings for delivering the cotton from said head to a receiver.

5. A cotton harvester unit including a power means, said unit adapted to be attached to the side of a tractor or the like and including a head supporting frame, a cotton gathering head floatingly suspended from said supporting means, oppositely arranged pairs of combined rotary impact and air induction devices mounted in said head, said pairs being relatively disposed to define a cotton plant passageway therebetween, each pair including vertically disposed cylinders and radial vanes extending from said cylinders and coextensive with their length, the vanes of one of said cylinders of each pair coacting with those of its companion cylinder to provide a circuitous air and cotton path between said vanes, mechanism for imparting rotary movement to the cylinders of each pair, means for effecting power transfer from said power means to said mechanism, shafts for the cylinders of said devices, top and bottom plates for said devices, said cylinder shafts having journaled connection with said plates, the shafts of the opposed rear cylinders serve as pivots for said devices, means for laterally adjusting the opposed front cylinders to vary the area of the forward portion of said plant passage, guard means coacting with the vanes of said pairs of cylinders engageable with the cotton plants passing through said passage, and means for delivering the cotton from said head to a receiver.

6. A cotton harvester unit, a power plant in connection with said unit, a vertically movable head, pairs of cylinders rotatably mounted within the head, one pair of cylinders being arranged on each side of a plant passage through the head, each pair of cylinders having radially extending vanes, said vanes being coextensive in length with that of the cylinders, the vanes of each pair of cylinders projecting between those of the adjacent cylinders to form a circuitous path therebetween, so as to permit the passage therethrough of the cotton without injury, mechanism for imparting rotary movement to each pair thereof so that the cylinders of each pair rotate in opposite direction, means for transferring power from said power plant to said mechanism, and means for laterally adjusting the forward cylinder of each pair thereof toward each other so as to vary the width of the plant passage, and suction means in connection with the opposite sides of the head and cooperating with each pair of said cylinders to effect delivery of the cotton as it passes from said head to a receiver.

RILEY E. ELLIS.
JOSEPH A. ASHKOUTI.

References Cited in the file of this patent
UNITED STATES PATENTS

| Number | Name | Date |
|---|---|---|
| 1,132,102 | Lee | Mar. 16, 1915 |
| 1,172,665 | Beebe et al. | Feb. 22, 1916 |
| 1,755,507 | Janacek | Apr. 22, 1930 |
| 1,930,767 | Neil | Oct. 17, 1933 |